March 30, 1965 — I. SZLECHTER — 3,175,359
ROTARY COMBUSTION ENGINE
Filed April 2, 1962 — 2 Sheets-Sheet 2

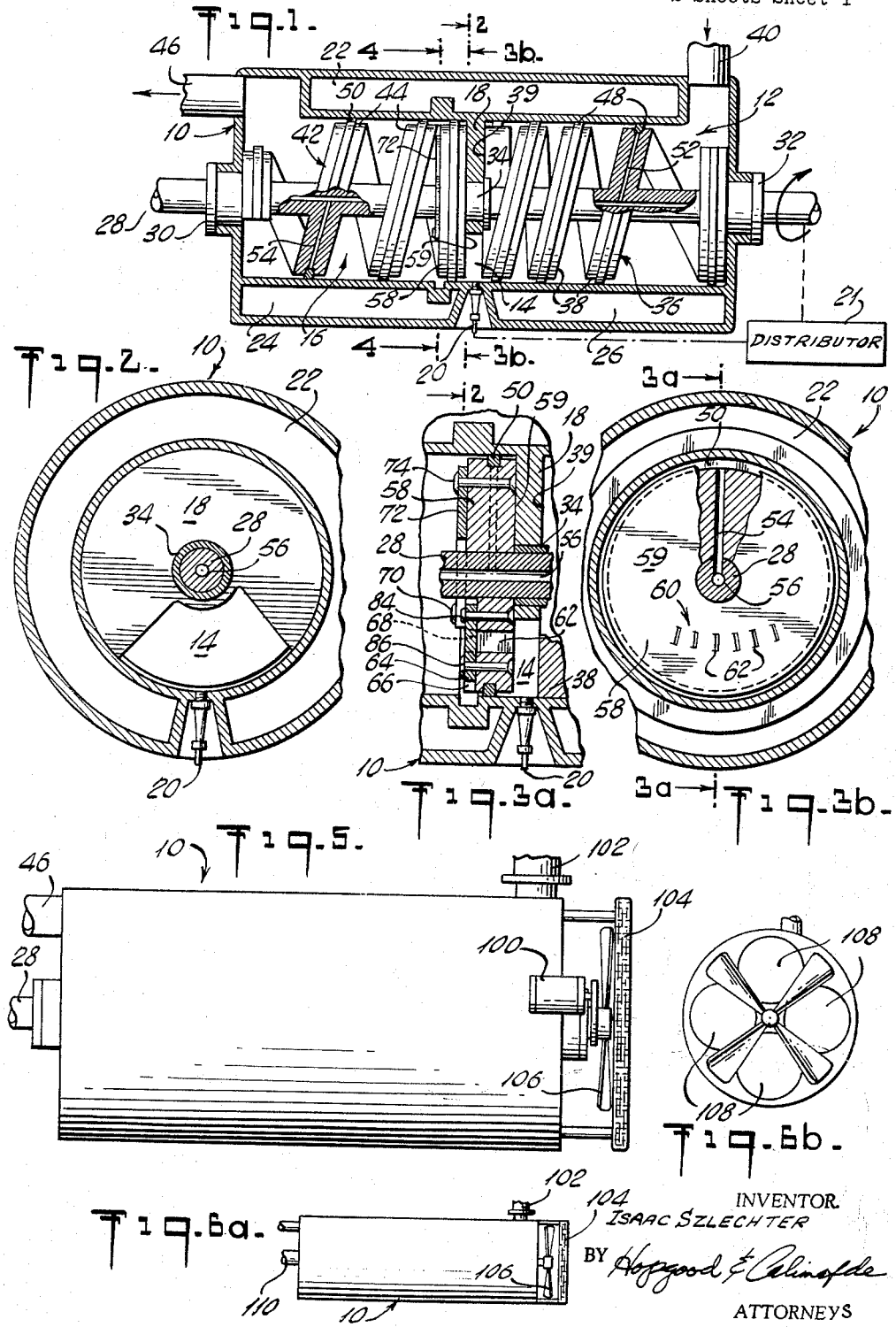

INVENTOR.
ISAAC SZLECHTER
BY Hopgood & Calimafde
ATTORNEYS

United States Patent Office 3,175,359
Patented Mar. 30, 1965

3,175,359
ROTARY COMBUSTION ENGINE
Isaac Szlechter, 183 Heyward St., Brooklyn 6, N.Y.
Filed Apr. 2, 1962, Ser. No. 184,369
7 Claims. (Cl. 60—39.45)

This invention relates to a rotary combustion engine and more particularly to such a device which employs a helical or screw type rotor for effecting compression of the combustible gases during operation.

It is an object of this invention to provide a rotary engine of extremely simple and economical construction.

A further object of the invention is to make available an engine which does not employ the large number of reciprocating parts as in conventional internal combustion engines and which is also of simpler construction than conventional turbine power units.

Figure 4A:
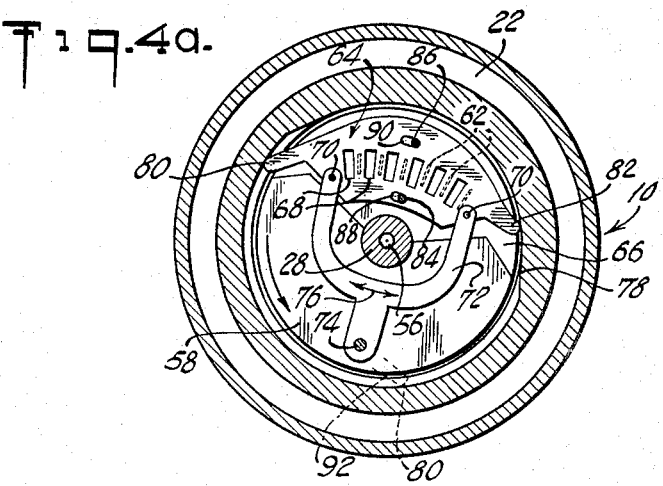
Figure 4B:
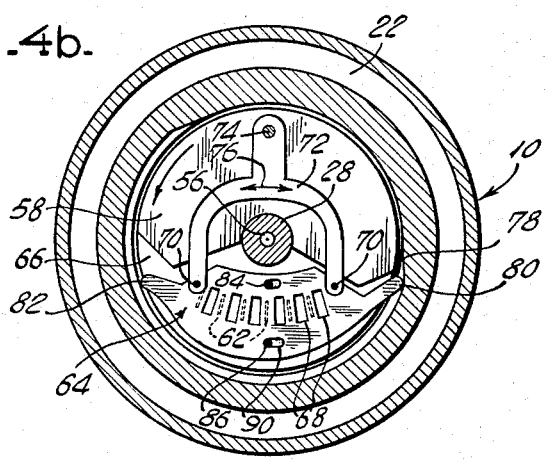
Figure 4C:
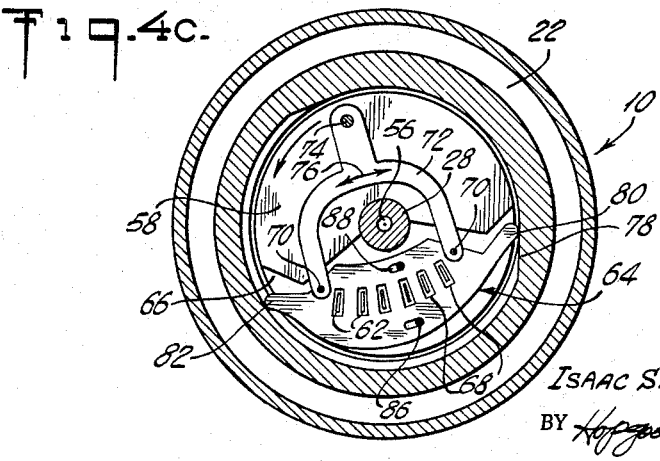

All of the objects, features and advantages of this invention and the manner of attaining them will become more apparent and the invention itself will be best understood by reference to the following description of an embodiment of the invention taken in conjunction with the accompanying drawing, in which FIG. 1 is an elevation view partly in section of an engine constructed in accordance with the teaching of this invention, FIG. 2 is a view showing a partition forming a part of the structure of FIG. 1 and taken along line 2—2 thereof and looking in the direction of the arrows, FIG. 3a is a partial view of the device of FIG. 1 showing details of a portion of the rotor construction and cooperating elements, FIG. 3b is an end view of the elements of FIG. 3a taken on the line 3b—3b of FIG. 1 and looking in the direction of the arrows, FIGS. 4a, 4b and 4c are views taken along the line 4—4 of FIG. 1 looking in the direction of the arrows and showing the rotor in different positions of its rotation, FIG. 5 is a side view showing one preferred form of the invention with its associated operating accessories, and FIGS. 6a and 6b are side and end views respectively of another form of the invention also with its associated operating accessories.

Briefly, the invention comprises a rotary combustion engine having a housing with a compression chamber therein with an input port for receiving a combustible mixture and means therein for detonating the mixture. There is also included a rotatable shaft which extends into the compression chamber and carries a helical member, within the combustion chamber, to deliver the combustible mixture to the combustion chamber in a compressed condition. A plurality of turbine type impeller blades are provided on the shaft on the exhaust side of the combustion chamber which drive the shaft as a result of burned gases impinging thereon from the combustion chamber. The invention further includes a first closure means for closing off the combustion chamber from the compression chamber for a predetermined angle of rotation of the shaft. Second closure means are also provided for preventing the escape of the combustible mixture from the combustion chamber into the atmosphere. This second closure means additionally prevents the passage of the burning gases from the combustion chamber into the atmosphere for a predetermined angle of rotation of the shaft and is also operable to allow passage of the burned gases at a predetermined position of the shaft.

In accordance with another aspect of the invention there may also be provided an exhaust chamber for receiving the burned gases from the combustion chamber. The exhaust chamber is provided with suitable means secured to the shaft for expelling the burned gas into the atmosphere.

Referring now particularly to FIG. 1, there is shown an engine constructed in accordance with the invention which includes a housing 10 having a compression chamber 12, a combustion chamber 14 and an exhaust chamber 16. A partition 18 is provided, see also FIG. 2, which separates the compression chamber 12 from the exhaust chamber 16, and in the lower part of which is formed the combustion chamber 14. A spark plug 20 is provided in the housing 10 and extends partially into the combustion chamber 14. The spark plug 20 is connected to a suitable distributor 21 for receiving electrical impulses therefrom. Water jackets 22, 24 and 26 are provided so that the engine may be cooled by circulation of water in a manner well known.

A longitudinal rotor shaft 28 is mounted to pass through the entire length of the housing 10 and is adapted to rotate on suitable bearings 30 and 32 in the ends of the housing and a bearing 34 in the partition 18. A screw or helical member 36, hereinafter called a compression screw 36, is provided in the compression chamber and secured to the shaft 28. Adjacent blades 38 of the compression screw 36 are spaced progressively closer together at distances progressively closer to the combustion chamber 14 to thereby form correspondingly spaced helical channels between these blades. A portion of the left end of the compression screw 36 is provided with a planar surface 39 in close clearance or sliding contact relationship with the compression side surface of the partition 18, and cooperates therewith to close off the combustion chamber 14 from the compression chamber 12 during a portion of the operational cycle, as will be explained. Thus the planar surface 39 is somewhat larger than the area of the combustion chamber 14 as viewed in FIG. 2. An input port 40 is provided in the compression chamber 12 for receiving a combustible mixture of fuel and air, as will appear.

A second helical or screw member 42 hereinafter called an exhaust screw 42, is provided in the exhaust chamber 16 and is also secured to the shaft 28. Adjacent blades 44 of the exhaust screw are spaced progressively further apart at distances progressively further from the combustion chamber 14 to thereby form progressively larger helical channels between these blades. An exhaust port 46 is provided in the exhaust chamber 16 to carry the burned gases out of the engine. Compression rings 48 and 50 are located at the periphery of compression screw 36 and the exhaust screw 42, respectively. Oil passages 52 and 54 are also provided in the compression screw 36 and the exhaust screw 42, respectively, both of which receive a supply of lubricating oil through a bore 56 in the shaft 28, from a suitable pump and oil supply, not shown.

Referring now particularly to FIGS. 3a and 3b, the extreme right end section 58 of the exhaust screw 42 has a planar surface 59 in close clearance or sliding contact relationship with the exhaust side surface of the partition 18. This construction aids in preventing escape from the combustion chamber 14 of the compressed combustible mixture before combustion and of the expanded gases during and after combustion. The extreme right end section 58 of the exhaust screw 42 is provided with a plurality of slots 60, which collectively occupy an angular spread preferably larger than the angular spread of the combustion chamber 14. These slots are so shaped as to define radially extending turbine type impeller blades 62 integral with the right end section 58 of the exhaust screw 42. Alternatively, the impeller blades 62 may be made separately and secured in any suitable manner in a slot-like opening provided therefor in the exhaust screw section 58. In any event, these impeller blades 62 are angularly disposed with respect to the planar surface 59 so that expanding gases from the combustion chamber 14 will produce rotation of the rotor shaft 28 in a clockwise direction when viewed from its right end.

Referring now to FIGS. 4a, 4b and 4c, there is provided a shutter plate 64 in a recess 66 of the exhaust screw section 58, having a plurality of exhaust openings or slots 68 spaced apart the same distance as the blades 62. The shutter plate 64 serves to close off the combustion chamber 14 from the exhaust chamber 16 during a portion of the operational cycle. This is accomplished by moving the plate 64 back and forth in the recess 66. The shutter plate 64 is connected by rivets 70 to a Y-shaped member 72 which is pivotally secured by a rivet 74 to the helix section 58. Thus the back and forth travel of the shutter plate 64, indicated by the double headed arrow 76 is actually a slightly arcuate movement about the rivet 74. This movement is produced as a result of the cam and follower action of the cam surface 78 on the follower arms 80 and 82 of the shutter plate 64. In order for the shutter plate 64 to be most effective in closing off the combustion chamber 14 from the exhaust chamber 16, it is held in close clearance or sliding contact relationship with the blades 62 by means of rivets 84 and 86. Slots 88 and 90 are provided for each rivet 84 and 86 to allow for sufficient back and forth travel of the shutter plate 64.

The operation of the engine is as follows: As the rotor shaft 28 is rotated in a counterclockwise direction as viewed from the exhaust chamber end of the housing 10, a mixture of air and fuel, such as gasoline, is drawn into the compression chamber 12 through the input port 40 and is progressively advanced by the compression screw 36. As this screw 36 continues to rotate, the combustible mixture is compressed in the combustion chamber 14. In order to do this, the combustion chamber 14 must first be closed to the exhaust chamber 16. This is achieved by the shutter plate 64 being so positioned as to cover the slots between the blades 62. This closure must take place at a time somewhat before the closure of the compression chamber 12 from the exhaust chamber 14 so that the action of the compression screw 36 can be effective to compress the combustible mixture in the exhaust chamber. FIG. 4a shows the shutter plate 64 just after it has closed the slots between the blades 62. As the shaft 28 continues to rotate, the compression screw 36 will compress the combustible mixture into the combustion chamber 14 for approximately 120° of rotation when the surface 39 of the helix will then close off the compression chamber 12 from the combustion chamber 14; the angular position of the shutter plate 64 and its associated elements at this point is illustrated in FIG. 4a by the dashed outline indicated by the numeral 92.

At this point or immediately thereafter, the distributor 21, which is of course timed to the rotation of the shaft 28 by suitable conventional means, sends an electrical impulse to the spark plug 20, causing ignition of the mixture in the combustion chamber 14. The shutter plate 64 is maintained in the closed position until the rotor assembly has rotated to the position shown in FIG. 4b to allow time for complete burning of the mixture in the combustion chamber 14. Complete combustion will have taken place by the time the rotor assembly has reached the position shown in FIG. 4b at which time further rotation of the assembly causes the cam surface 78 acting on the follower arm 80 to move the shutter plate 64 to the open position, see FIG. 4c. With the path to the exhaust chamber 16 now open, the expanded gases in the combustion chamber 14 pass quickly into the exhaust chamber, impinging upon the turbine type blades 62 as they pass. This, of course, produces a driving force which causes rotation of the shaft 28 and its entire rotor assembly. As rotation continues beyond the point shown in FIG. 4c all of the burned gases pass into the exhaust chamber 16 where they are expelled by means of the exhaust screw 42 through the exhaust port 46 into the atmosphere. The entire cycle as described above is then repeated for each revolution of the shaft 28.

While one form of the invention has been described above, it will be appreciated that an operable engine can be constructed in accordance with the principles of the invention which does not include either the exhaust chamber 16 or the exhaust screw 42. In such event the burned gases from the combustion chamber would pass directly into the atmosphere after passing through the slots 68 in the shutter plate 64.

FIG. 5 shows an external view of the engine of this invention with the various accessories necessary for satisfactory operation. Thus there is provided a starter motor 100, a carburetor 102, a cooling radiator 104 and a fan 106. FIGS. 6a and 6b further illustrate an engine comprising four engine units 108 constructed in accordance with the invention. It will be understood that in FIG. 6 the power output shaft 110 is mechanically coupled by any suitable means such as gears to the shaft of each individual engine unit 108.

It will be appreciated that by means of my invention, there is now available an engine of very simple and economical construction. It will be obvious that this construction is extremely advantageous in that it employs very few operating parts compared with those in engines of the internal combustion type in common use. It is also simpler in construction than conventional turbine power units. Accordingly the invention described herein makes possible manufacturing and operating economies over known internal combustion engines and turbine constructions.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A rotary engine comprising a housing,
   a compression chamber in said housing, said chamber having an input port for receiving a combustible mixture,
   a combustion chamber positioned adjacent one end of said compression chamber and external thereto,
   a rotable shaft extending into said compression chamber,
   a helical member secured to said shaft within said compression chamber to deliver said combustible mixture to said combustion chamber in a compressed condition,
   a plurality of impeller blades carried by said shaft on the side of said combustion chamber opposite said compression chamber,
   means for detonating a combustible mixture within said combustion chamber each time said shaft makes a complete revolution,
   first closure means for closing off said combustion chamber from said compression chamber for a predetermined angle of rotation of said shaft,
   and second closure means for preventing the escape of said combustible mixture from said combustion chamber into the atmosphere, said second closure means further preventing the passage of the gases from said combustion chamber into the atmosphere for a predetermined angle of rotation of said shaft, said second closure means also being operable to allow passage of the burned gases from said combustion chamber at a predetermined position of rotation of said shaft.

2. A rotary engine comprising a housing,
   a first chamber at one end of said housing and having an input port for receiving a combustible mixture, a second chamber at another end of said housing and having an output port for transmitting burned gases into the atmosphere, a combustion chamber located intermediate said first and second chambers, a rotatable shaft extending into both of said first and second chambers, a helical member secured to said shaft within said first chamber to deliver said combustible mixture to said combustion chamber in a compressed condition, a plurality of impeller blades within said second chamber, said blades being located immediately adjacent said combustion chamber and also being secured to said shaft so as to be rotatable therewith, means in said combustion chamber for detonating a combustible mixture within said combustion chamber each time said shaft makes a complete revolution, first closure means for closing off said combustion chamber from said compression chamber for a predetermined angle of rotation of said shaft, second closure means for preventing the escape of said combustible mixture from said combustion chamber into said exhaust chamber, said second closure means further preventing the passage of the gases from said combustion chamber into said exhaust chamber for a predetermined angle of rotation of said shaft, said second closure means also being operable to allow passage of the burned gases from said combustion chamber to said exhaust chamber at a predetermined position of rotation of said shaft, and means secured to said shaft for expelling the burned gases from said exhaust chamber.

3. The invention described in claim 2, wherein said helical member comprises a continuous screw shaped body which forms a first continuous channel from one end of said helical member to the other, the channel being progressively smaller in cross sectional area in the direction toward said combustion chamber, and wherein said means for expelling the burned gases from said exhaust chamber comprises a continuous screw shaped body which forms a second continuous channel from one end thereof to the other, said second channel being progressively larger in cross sectional area in the direction away from said combustion chamber.

4. The invention described in claim 2, wherein a partition is formed between said first and second chambers, one boundary of said exhaust chamber being formed by said partition.

5. The invention described in claim 4, wherein said first closure means comprises a planar portion of one end of said helical member in close clearance relation with the side of said partition nearest said first chamber.

6. The invention described in claim 2, wherein said second closure means comprises a member disposed in close clearance relation with said blades and being movable into first and second positions at predetermined positions of said shaft, whereby said combustion and exhaust chambers are closed off from one another, said second closure means further comprising a shutter plate rotatable with said shaft, said shutter plate having a plurality of spaced openings therein for cooperating with openings between said blades, said shutter plate being moved between said first and second positions by means of follower members thereon cooperating with a cam surface fixed to said housing.

7. A rotary engine comprising a housing, a compression chamber at one end of said housing and having an input port for receiving a combustible port of fuel and air, an exhaust chamber at another end of said housing having an output port for transmitting burned gases into the atmosphere, a combustion chamber located intermediate said compression and exhaust chambers, a shaft extending through both of said said compression and exhaust chambers, a first screw-like member secured to said shaft within said compression chamber to deliver said combustible mixture to said combustion chamber in a compressed condition, a plurality of impeller blades within said exhaust chamber, said blades being located immediately adjacent said combustion chamber and also being secured to said shaft so as to be rotatable therewith, a spark plug in said combustion chamber for detonating a combustible mixture within said combustion chamber each time said shaft makes a complete revolution, closure means for closing off said combustion chamber from said compression chamber for a predetermined angle of rotation of said shaft, a shutter plate secured to said shaft and having a closed position for closing off said combustion chamber from said exhaust chamber for a predetermined angle of rotation of said shaft, said shutter plate also having an open position for allowing burned gases from said combustion chamber to pass from said combustion chamber to said exhaust chamber while impinging on said blades, and a second screw-like member secured to said shaft within said exhaust chamber to expel the burned gases from said exhaust chamber into the atmosphere.

References Cited in the file of this patent
UNITED STATES PATENTS

| | | |
|---|---|---|
| 1,726,104 | Harris | Aug. 27, 1929 |
| 2,511,441 | Loubiere | June 13, 1950 |